United States Patent
Hyland

(10) Patent No.: US 8,045,498 B2
(45) Date of Patent: Oct. 25, 2011

(54) SYSTEM AND METHOD FOR MONITORING THE LOCATION OF A MOBILE NETWORK UNIT

(75) Inventor: Kieran Richard Hyland, Blarney (IE)

(73) Assignee: Hyintel Limited, County Cork (IE)

( * ) Notice: Subject to any disclaimer, the term of this patent is extended or adjusted under 35 U.S.C. 154(b) by 0 days.

(21) Appl. No.: 12/223,839

(22) PCT Filed: Feb. 12, 2007

(86) PCT No.: PCT/EP2007/051356
§ 371 (c)(1),
(2), (4) Date: Apr. 12, 2010

(87) PCT Pub. No.: WO2007/090903
PCT Pub. Date: Aug. 16, 2007

(65) Prior Publication Data
US 2010/0195511 A1    Aug. 5, 2010

(30) Foreign Application Priority Data

Feb. 10, 2006  (IE) .................................. S2006/0092
Mar. 29, 2006  (IE) .................................. S2006/0245

(51) Int. Cl.
*H04B 7/14*    (2006.01)
*H04W 24/00*   (2009.01)

(52) U.S. Cl. .................................. 370/315; 455/456.1

(58) Field of Classification Search .................. None
See application file for complete search history.

(56) References Cited

U.S. PATENT DOCUMENTS

| | | | |
|---|---|---|---|
| 6,421,009 B2* | 7/2002 | Suprunov | 342/465 |
| 2004/0162084 A1* | 8/2004 | Wang | 455/456.1 |
| 2004/0219931 A1* | 11/2004 | Bi et al. | 455/456.1 |
| 2007/0069884 A1* | 3/2007 | Waxman | 340/539.1 |
| 2008/0158062 A1* | 7/2008 | Fullerton et al. | 342/458 |
| 2008/0285730 A1* | 11/2008 | Allaway et al. | 379/88.14 |
| 2010/0191593 A1* | 7/2010 | Wang et al. | 705/14.27 |

* cited by examiner

*Primary Examiner* — Ricky Ngo
*Assistant Examiner* — Clemence Han
(74) *Attorney, Agent, or Firm* — Valauskas Corder LLC

(57) ABSTRACT

This invention relates to a system (3) and method for monitoring the location of a mobile network unit (9) in a low-power localised wireless communication network (10) such as a wireless personal area network (WPAN). The WPAN could be a ZigBee network. The system (3) comprises a localised wireless communication network (10) having a control unit (5), a plurality of fixed network units (7) and a plurality of mobile network units (9). The mobile network units (9) transmit identification signals and two or more fixed network units (7) receive the identification signals directly and calculate the strength of the identification signals. This information is transmitted to the control unit (5) where the control unit processor calculates with a high degree of accuracy the position of the mobile network unit (9). It is possible to track and plot the location and movement of one or more mobile network units.

40 Claims, 2 Drawing Sheets

SYSTEM AND METHOD FOR MONITORING THE LOCATION OF A MOBILE NETWORK UNIT

INTRODUCTION

Figure 1:
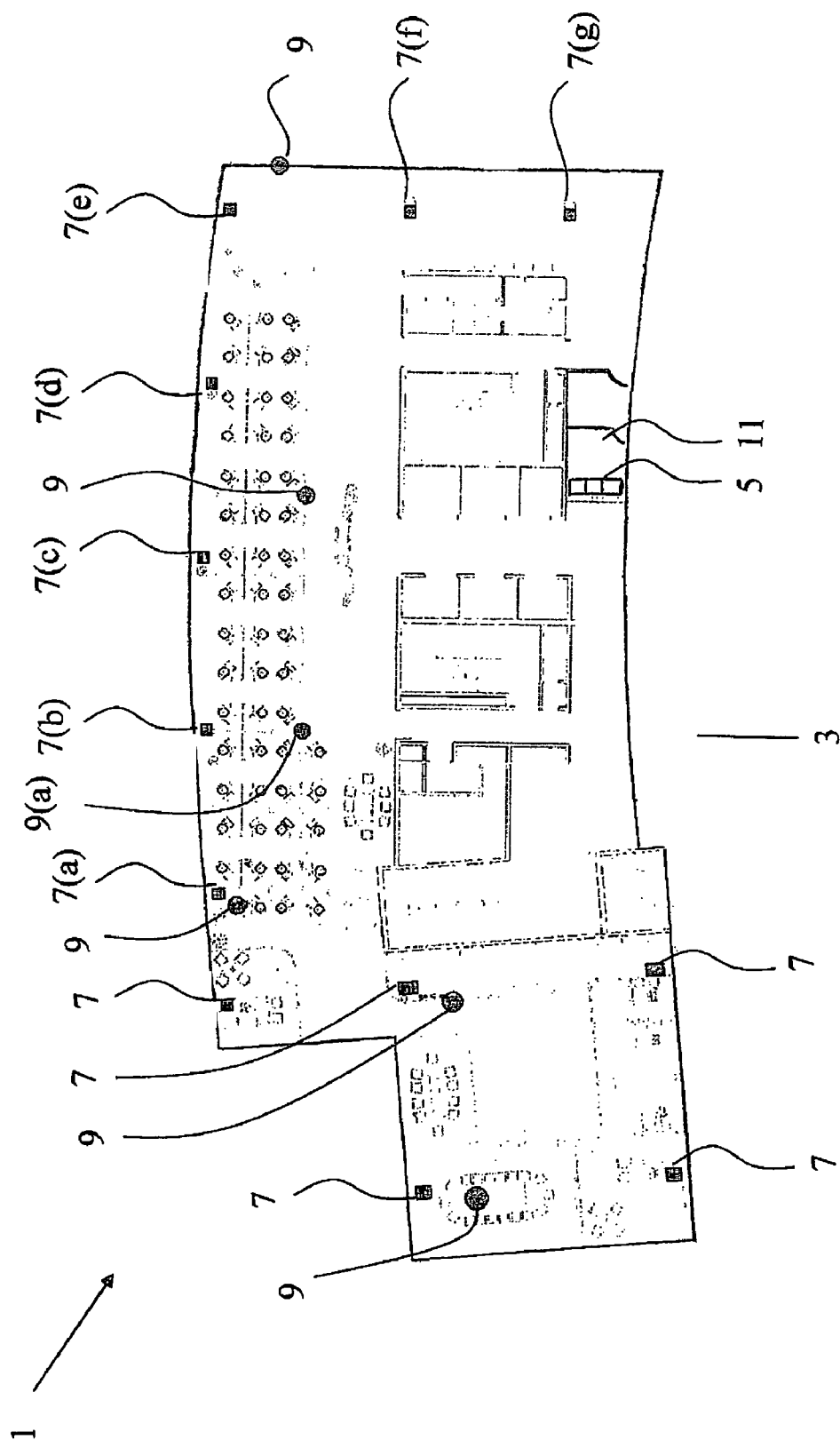

This invention relates to a system and method for monitoring the location of a mobile network unit in a low-power, localised wireless communication network.

It will be understood that throughout this specification the terms low-power, localised wireless communication network and wireless communication network have been used interchangeably. Therefore, any reference to a wireless communication network will be understood to mean specifically a low-power, localised wireless communication network unless otherwise specifically stated. The invention relates to wireless communication networks of the type that may operate on a very low power supply, typically no more than a few volts, and used for very short range communications typically of the order of less than 100 m between components of the network. The present invention in no way relates to mobile telephony applications and those large scale, relatively high power wireless communication networks with potentially long transmission ranges (e.g. over 100 m) between components but in fact relates solely to much smaller scale wireless network such as those found in an individual building or other similar type of structure.

Wireless communication networks are becoming more and more popular due to the ease of installation, relatively inexpensive equipment and scalable nature of the wireless communication networks. These wireless communication networks may be installed in a building or other structure with the minimum of disruption to the inhabitants as the individual charged with the installation of the network does not have to spend significant amounts of time drilling holes for power or communications wiring in the structure and may quickly install a comprehensive network throughout the installation in a fraction of the time that it would take with the previous wired networks.

Generally speaking, the wireless communication networks comprise a number of fixed network units, a control unit with a processor and accessible memory and one or more mobile network units. The mobile network units communicate with the control unit, which may have a database that the user of the mobile network device wishes to populate with data from the mobile network device, through the network of fixed network modules.

Typically, data is sent by the mobile network unit to the control unit via one or more of the fixed network units. The fixed network units cooperate with each other to provide a channel for the data to be transmitted to the control unit. It is not necessary to have fixed communication channels and data may follow a different route to the control unit each time. Therefore, data that is sent over the wireless communication network is not reliant on all of the fixed network units operating correctly and if a fixed network unit should fail, an alternative route for the data will be found through the wireless communications network. Secondly, and even more importantly, the mobile network unit is not restricted to transmitting messages from a single point and may transmit messages from anywhere throughout the network.

One very useful implementation of such a wireless communication network is the so-called ZigBee network. The main advantage of ZigBee is that ZigBee provides a relatively inexpensive way to transmit small packets of data from a mobile network unit to a control unit. Due to the fact that ZigBee limits itself to small packets of data, the apparatus used for the fixed network units and the mobile network units may be relatively simple and inexpensive. This helps to reduce the overall cost of installation of the network. Furthermore, due to the fact that the data packets are smaller than equivalent wireless communication networks, the computational burden and the communication overheads in the wireless communication network are also reduced significantly.

Although the known wireless communication networks are very useful for carrying out relatively simple data capture tasks and providing remote automation facilities, industry is constantly looking for new and beneficial ways to take advantage of these low-powered wireless communication network technologies, and ZigBee in particular, so that they may be exploited to the fullest extent. Furthermore, it is felt in some circles that the present wireless communication networks are too limited in their functionality and that they are simply not practical to implement on a large scale.

It is the object therefore of the present invention to provide a system and method that overcome at least some of the problems and difficulties associated with the known systems and methods. It is a further object of the invention to provide a system that enhances the functionality of the wireless communication networks that is inexpensive and simple to implement and that adds value to the known systems.

STATEMENTS OF INVENTION

According to the invention there is provided system for monitoring the location of a mobile network unit, the system comprising a localised wireless communication network having a control unit, a plurality of fixed network units and at least one mobile network unit, the control unit further comprising a processor having accessible memory;

the mobile network unit further comprising a transmitter for transmitting an identification signal unique to that mobile network unit;

the fixed network units each having a transceiver having means to receive the identification signal directly from a mobile network unit within a predetermined radius of the fixed network unit and indirectly from another fixed network unit, the fixed network units having means to determine the strength of the identification signal received directly from the mobile network unit, and the transceiver further comprising means to transmit the identification signal data and signal strength data to the control unit through the wireless communication network;

the control unit processor having means to collate the identification signal data and signal strength data received from a pair of fixed network units that received the identification signal directly from a mobile network unit and determine the location of the mobile network unit.

By having such a system, it is possible to accurately identify the position of a mobile network unit within the wireless communication network. Instead of the data being transmitted by the mobile network unit being sent directly through the network by the fixed network units, a number of fixed network units may receive the signal and each of the network units that receive the initial identification signal will transmit that signal onwards to the control unit through the wireless network. In this way, as a number of the fixed network units have received the initial identification signal and sent that information onwards to the control unit, it is possible for the processor in the control unit to identify the location of the fixed network units and thereafter determine the location of the mobile network unit based on the fixed network units that received the initial identification signal. Furthermore, by determining the strength of the identification signal received by the fixed network unit, it is possible to more accurately determine the exact location of the mobile network unit in the wireless communication network.

It is envisaged that this feature may be used for a wide variety of disparate uses including the location of individuals or items of equipment carrying a mobile network unit or having a mobile network unit installed therein. Similarly, it is envisaged that the unit may be used to track the movements of one or more individuals within a structure, for example in a hospital environment it is possible to see whether an individual has been in a particular ward at a particular time of day and work practices may be monitored and improved as a result of the accurate tracking. This further enhances the usefulness of the known wireless communication networks.

In one embodiment of the invention there is provided a system in which the control unit processor has means to collate the signal identification data and signal strength data received from three fixed network units, each of which having received the identification signal directly from the mobile network unit, and determine the location of the mobile network unit. By combining the information from three fixed network units, it is possible to more accurately determine the precise location of the mobile network unit and therefore provide more accurate information to the individual charged with monitoring the data.

In another embodiment of the invention there is provided a system in which the wireless communication network further comprises a wireless personal area network (WPAN). This is seen as a particularly simple implementation of wireless communication network to use.

In a further embodiment of the invention there is provided a system in which the WPAN is a ZigBee network. The ZigBee network is seen as a particularly preferred network for use with the present invention as it is relatively inexpensive to install in a structure and furthermore is relatively discreet. The ZigBee units themselves transmit very small packets of data and therefore require less power to transmit the signals and accordingly they will not have to be services often in order to change their power supply. Finally, the small data packet size means that the computational burden and the communication overhead in the system will be significantly reduced.

In one embodiment of the invention there is provided a system in which the system is installed in a structure and in which the control unit has a floor plan layout of the structure stored in memory, the control unit processor having means to plot the location of a mobile network unit on the floor plan layout. In this way, the system may be installed in a building such as a hospital, prison, library, house, cruise liner or other structure so that it is an entirely self sufficient system that does not require further external equipment. Furthermore, this is seen as a particularly preferred embodiment of the invention as the position of the mobile network unit may be plotted on the floor plan and therefore the position of a mobile network unit may be known in relation to the actual layout of the structure in which it is installed which will facilitate quick and simple determination of its location in the structure. Furthermore, if desired, it is possible to see exactly where in the structure the mobile network unit has been.

In a further embodiment of the invention there is provided a system in which the control unit processor has means to plot the movement of a mobile network unit in the structure over time. By plotting the position of the mobile network unit over time, it will be possible to determine where in the structure the mobile network unit was at a particular given time and this will be particularly useful if for instance it is necessary that an individual should be in a particular location at a given time. By plotting the position of the mobile network unit, it is possible to determine where the mobile network unit was at any given time and accordingly where the individual carrying the mobile network unit was.

In one embodiment of the invention there is provided a system in which the mobile network unit further comprises means to receive an identity code from a user and the identification signal transmitted by the mobile network unit is generated using the identity code of the user. In this way, the mobile network units themselves may be a generic unit such as a card holder device that may be worn by an employee who may insert their card in the card holder each time they are at work. In this way, the mobile network unit may be left in the premises and not removed from the premises. The mobile network unit may form part of a uniform or security clothing and the employee's identity card will provide the actual identification signal identifying features.

In another embodiment of the invention there is provided a system in which the means to receive an identity codes from a user further comprises a card reader having means to read information from a data storage element on an identity card. Alternatively, the means to receive identity codes from a user further comprises a keypad having means to receive an identity code input on the keypad.

In one embodiment of the invention there is provided a system in which the mobile network unit's transmitter transmits an identification signal periodically at predetermined intervals. Alternatively, or in addition to the above, the mobile network unit's transmitter transmits an identification signal in response to a mobile network unit operator's actions.

In a further embodiment of the invention there is provided a system in which the predetermined radius of the fixed network unit is of the order of a 5 meter radius. By having the predetermined radius of the order of 5 meters, it is possible to ensure that a strong signal is received by the fixed network units so that they may accurately determine the strength of the signal to assist in positioning. While one will understand that it is not possible to set the range at an exact distance as the radio coverage will fade out gradually with distance, the effective range may be chosen so that it will clearly receive signals transmitted from within a given distance. Signals may also be received from outside that given distance but they may be disregarded due to the very low signal strength indicating that they are almost certainly outside the chosen range of the fixed network unit.

In one embodiment of the invention there is provided a system in which data received by the control unit is time stamped.

In another embodiment of the invention there is provided a system in which the processor has means to analyse the movement patterns of one of an individual mobile network unit or a group of mobile network units. Preferably, the control unit has means to analyse the movement patterns of one or more mobile network units in a particular area.

In one embodiment of the invention there is provided a system in which the control unit has means to generate an alarm based on predetermined irregular movement patterns of one or more mobile network units.

In another embodiment of the invention there is provided a method of monitoring the location of a mobile network unit in a system comprising a localised wireless communication network having a control unit, a plurality of fixed network units and at least one mobile network unit, the mobile network unit having means to transmit an identification signal unique to that mobile network unit, the fixed network units each having a transceiver having means to receive the identification signal directly from a mobile network unit within a predetermined radius of the fixed network unit and indirectly from another fixed network unit, the fixed network units having means to determine the strength of the identification signal received directly from the mobile network unit, and the transceiver further comprising means to transmit the identification signal data and signal strength data to the control unit through the wireless communication network, the control unit having a processor and accessible memory, the method comprising the steps of:

the mobile network unit transmitting an identification signal unique to that mobile network unit;

any of the fixed network units that receive that identification signal directly from the mobile network unit calculating the strength of the identification signal and transmitting the received identification signal data and signal strength data to the control unit;

any of the fixed network units that receive the identification signal data and signal strength data indirectly from another fixed network unit transmitting the identification signal data and signal strength data onwards to the control unit the control unit processor collating the identification signal data received from a pair of the fixed network units that received the identification signal directly from a mobile network unit and determining the location of the mobile network unit.

In a further embodiment of the invention there is provided a method in which the method further comprises the step of the control unit receiving the identification signal data and signal strength data from three fixed network units that received the identification signal directly and thereafter determining the location of the mobile network unit by triangulating the identification signal data.

In one embodiment of the invention there is provided a method in which the wireless communication network further comprises a wireless personal area network (WPAN) and in which the step of transmitting the identification signal to the control unit further comprises transmitting the identification signal through the WPAN. In another embodiment of the invention there is provided a method in which the WPAN is a ZigBee network and the step of transmitting the identification signal to the control unit further comprises transmitting the identification signal through a ZigBee communications network.

In a further embodiment of the invention there is provided a method in which the wireless communication network is installed in a structure and the control unit has a floor plan layout of the structure stored in memory, the method further comprising the steps of the control unit plotting the location of a mobile network unit on the floor plan layout. Preferably, the control unit plots the movement of the mobile network unit in the structure over time.

In another embodiment of the invention there is provided a method in which the method further comprises the steps of the mobile network unit receiving an identity code from a user and generating the identity signal using the identity code of the user.

In a further embodiment of the invention there is provided a method in which the step of the mobile network device transmitting an identification signal unique to that mobile network unit further comprises the mobile network device transmitting the identification signal periodically at predetermined intervals. Alternatively, or in addition to the above, the method comprises the step of the mobile network device transmitting the identification signal in response to a mobile network unit operator's actions.

In another embodiment of the invention there is provided a method in which the method comprises the step of the control unit analysing the movement patterns of one of an individual mobile network unit or a group of mobile network units. In a further embodiment the method comprises the step of the control unit analysing the movement patterns of one or more mobile network units in a particular area.

In one embodiment of the invention there is provided a method in which the method comprises the additional step of the control unit generating an alarm based on predetermined irregular movement patterns of one or more mobile network units.

DETAILED DESCRIPTION OF THE INVENTION

The present invention and its attributes and advantages will be further understood and appreciated with reference to the detailed description below of presently contemplated embodiments, taken in conjunction with the accompanying drawings.

The invention will now be more clearly understood from the following description of some embodiments thereof given by way of example only with reference to the accompanying drawings, in which:—

Figure 2:
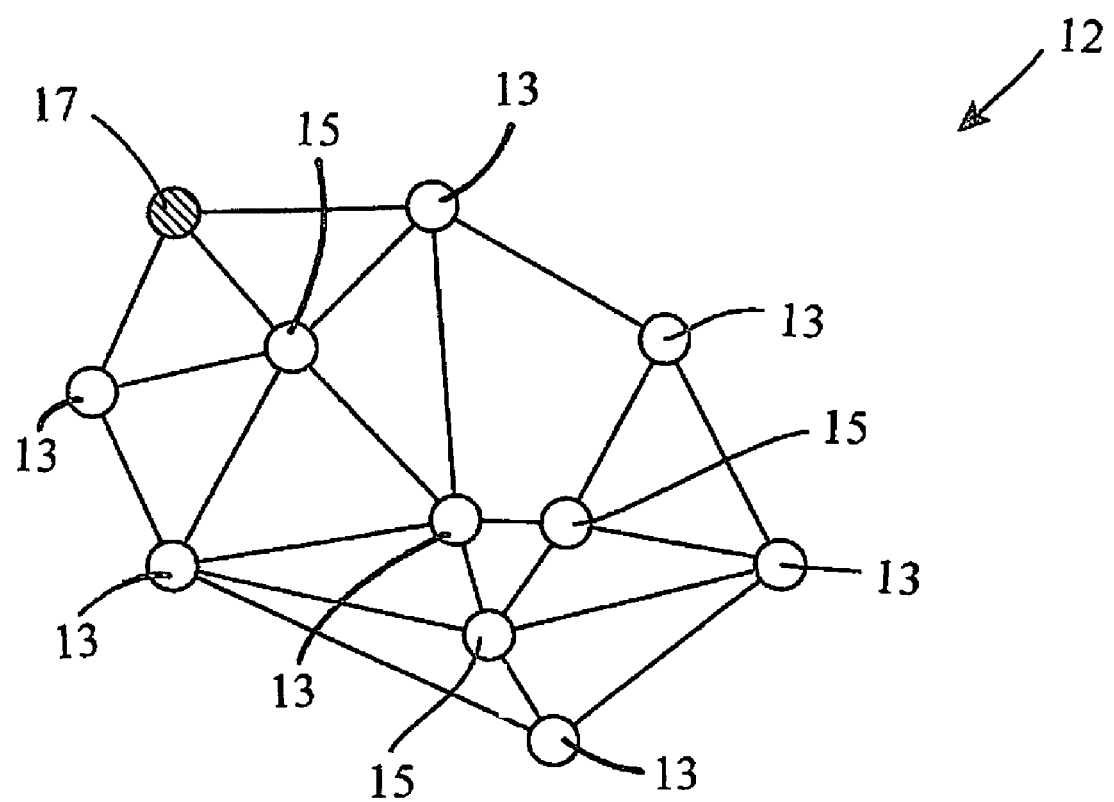

FIG. 1 is a floor plan of a typical structure in which the system according to the invention is installed; and FIG. 2 is a diagrammatic representation of a ZigBee network;

Referring to the drawings, and initially to FIG. 1 thereof, there is shown a floor plan layout of a building, not to scale, indicated generally by the reference numeral 1, in which the system 3 according to the invention is installed. The system 3 comprises a control unit 5, a plurality of fixed network units 7 and a plurality of mobile network units 9 all connected by way of a wireless communication network. The control unit 5 further comprises a processor (not shown) having an accessible memory (not shown). The mobile network units 9 each comprise a transmitter (not shown) for transmitting an identification signal and each of the fixed network units 7 comprise a transceiver (not shown) having means to receive an identification signal from a mobile network unit and means to transmit the received identification signal data to the control unit 5 over the wireless communication network. The wireless communication network is a Wireless Personal Area Network (WPAN), in this case a ZigBee network. The fixed network units also are provided with means (not shown) to determine the strength of the identification signal and the fixed network units transmit data relating to the strength of the received identification signal to the control unit over the ZigBee network. The control unit 5 has means to collate the identification signal data and signal strength data relating to a mobile network unit received from the two or more fixed network units and determine the location of the mobile network unit.

In use, the fixed network units 7 are distributed throughout a structure, in this case a floor of a building. This floor may be the premises of a particular company and it is envisaged that the system may be spread out over a number of floors although only one of which is shown for the purpose of clarity. The control unit 5 is stored in a server room 11 and there are a plurality of mobile network units also on that floor of the building. These mobile network units may be small units worn by certain employees to allow their whereabouts to be monitored or alternatively, these units may be located in equipment to allow the position of certain equipment to be monitored at any given time. The mobile network units transmit an identification signal periodically, for example, every 1, 5 or 30 seconds into the surrounding environment. The periodicity at which the identification signal is transmitted may be selectively chosen and what is important is that it is sufficient to allow the mobile network unit to be monitored effectively. Any of the fixed network units within a predetermined radius, in this case 5 meters, will detect that identification signal directly and they will determine the strength of the identification signal. Each of the fixed network units that received the identification signal directly will transmit the identification signal data and the strength signal data to the control unit 5 over the ZigBee network. The data may be transmitted through other fixed network units en route to the control unit.

It is important to note that the control unit 5 may be linked back to a further processing unit over the structures existing IT infrastructure, e.g. Ethernet over CAT5 cable or alternatively over a WiFi network. In this way, multiple control units in different areas may be connected back to a central server. In such instances, it will be understood that the control unit 5 will further comprise a ZigBee to Ethernet bridge or a ZigBee to WiFi bridge.

This relaying of the identification signal data by the fixed network units is considered to be the fixed network units receiving the identification signal data indirectly. In other words, if the fixed network unit receives the identification signal from a mobile network device, it is said to receive the identification signal directly. However, if the fixed network device receives the identification signal from another fixed network device, it is said to have received the identification signal indirectly. Those fixed network units that receive the identification signal directly will calculate the strength of the identification signal so that the control unit can use the information from two or more fixed network units to determine the location of a mobile network device.

For example, the mobile network unit 9(*a*) transmits an identification signal. This identification signal is detected and received directly by fixed network units 7(*a*), 7(*b*) and 7(*c*). Each of the fixed network units 7(*a*), 7(*b*) and 7(*c*) determine the strength of the identification signal received. Then, once this has been achieved, the fixed network units 7(*a*), 7(*b*) and 7(*c*) each transmit the identification signal data and signal strength data to the control unit 5 via at least some of the other fixed network units 7(*b*), 7(*c*), 7(*d*), 7(*e*), 7(*f*) and 7(*g*) in the wireless communication network. In the embodiment shown, the signal strength data and identification data received by fixed network unit 7(*a*) is transmitted to the control unit 5 via fixed network unit 7(*b*) and then to fixed network unit 7(*c*), and then to each of fixed network units 7(*d*), 7(*e*), 7(*f*) and 7(*g*) in turn before being transmitted by fixed network unit 7(*g*) to the control unit. In this instance, the fixed network unit 7(*a*) is said to have received the identification signal directly and the fixed network units 7(*b*), 7(*c*), 7(*d*), 7(*e*), 7(*f*) and 7(*g*) are said to have received that identification signal indirectly.

Similarly, the signal strength data and identification data received directly by fixed network unit 7(*b*) is transmitted to the control unit 5 via fixed network unit 7(*c*) and then to fixed network unit 7(*d*), and then to each of fixed network units 7(*e*), 7(*f*) and 7(*g*) in turn before being transmitted by fixed network unit 7(*g*) to the control unit. In this instance, the fixed network unit 7(*b*) is said to have received the identification signal directly and the fixed network units 7(*c*), 7(*d*), 7(*e*), 7(*f*) and 7(*g*) are said to have received that identification signal indirectly. Finally, the signal strength data and identification data received directly by fixed network unit 7(*c*) is transmitted to the control unit 5 via fixed network unit 7(*d*) and then to fixed network unit 7(*e*), and then to fixed network unit 7(*f*) before being transmitted to fixed network unit 7(*g*) before being transmitted by fixed network unit 7(*g*) to the control unit 5. In this instance, the fixed network unit 7(*c*) is said to have received the identification signal directly and the fixed network units 7(*d*), 7(*e*), 7(*f*) and 7(*g*) are said to have received that identification signal and signal strength data indirectly.

The processor (not shown) of the control unit 5 may then determine the exact location of the mobile network unit in the structure. The control unit 5 has a floor plan of the building in memory and each piece of identification data and signal strength data is time stamped as it is received by the processor so that the control unit may effectively map the location of the mobile network unit over time on the floor plan. It will be understood that the fixed network units may be wireless devices with their own power supply such as a battery pack. Alternatively, it is envisaged that these fixed network units may operate on mains power and they could be plugged in to a standard socket in the building for convenience. In this way, the units would not have to be serviced in order to change the batteries every so often which helps to reduce the maintenance cost of such a system.

Referring to FIG. 2 of the drawings there is shown a schematic representation of a ZigBee network 12 that may be used by the present invention. The ZigBee network 12 comprises a plurality of static nodes 13 which are provided by the fixed network units, a plurality of mobile nodes 15 which are provided by the mobile network units and a gateway node 17, which is also provided by way of a fixed network unit. The gateway node 17 communicates directly with the control unit (not shown). Each of the static nodes obtains information from the mobile nodes and transmits this information through the ZigBee network via at least the gateway node to the control unit. The difference with the present invention is that the present invention, instead of routing the information relating to a mobile unit from one node only through the system, each of the static nodes that receives information from a mobile unit will transmit that information through the network to the control unit so that an identification signal transmitted by a mobile node will not be sent by one static node but will be sent by each of the static nodes. In this way, the system is able to more accurately pinpoint the exact position of the mobile network unit/mobile node so that their exact position may be determined rather than simply that they are within a predetermined radius of a static node. This is highly advantageous.

It will be understood that the invention has been described throughout primarily with the goal of locating precisely an individual or a piece of equipment in a building at any given time and thereafter being able to plot the position of that individual, over time if required. However, the uses for the present invention extend far beyond simply the tracking of an individual or a piece of equipment to determine their exact position for logging purposes. The information may be used for a wide variety of purposes by using the spirit of the invention. For example, the present invention could be used to track the movement and work practices of staff of a company, for example in a warehouse or an office floor over time. In this way, the productivity and time and flow management exercises may be performed to facilitate the operation of the company. Similarly, the invention may be used to track the exact whereabouts of individual staff members which may be necessary to determine whether a certain employee was where they say they were at a particular time. For example, in an environment with valuable goods stored in certain locations, it is possible to determine what employee was in a particular area at a particular time or whether they were where they were supposed to be at a particular time. This provides greater accountability for the actions of the employees.

While the application of the invention has been described with regard to medical application in a hospital environment, it will be understood that the invention can apply to any area of commerce which require the monitoring of hygiene standards. These include the food and beverage preparation and processing industries, animal health and hygiene, fish processing and preparation, chemical, healthcare and pharmaceutical, information and communication industry, any activity requiring clean room facilities, educational establishments, leisure and fitness industries, medical and dental facilities/manufacturing entities, pleasure industry and the invention also concerns institutional facilities, e.g. prisons, foster homes and the like.

Finally, it is envisaged that although in the embodiments described the control unit and the fixed network units have been described as entirely separate entities, the control unit may also be used to perform the function of a fixed network unit itself. Therefore, the control unit would have all of the properties of a fixed unit also. Furthermore, it is envisaged that the control unit may be located remotely from the mobile network units and the fixed network units. By remote what is meant is separated from or even located in another jurisdiction. In the case of the control unit being located in another jurisdiction, it is envisaged that a high-powered transceiver may be used to augment the wireless communications network specifically for communications with the control unit. The low powered localised wireless communication network has been described as a WPAN and more specifically a ZigBee WPAN. For further detail on the implementation of the ZigBee network, reference should be made to the open public standard IEEE 802.15.4, the entire disclosure and teachings of which is incorporated herein by way of reference. However, it is envisaged that the wireless communication network could be another low-powered wireless communication network that supports a mesh network.

In this specification the terms "comprise, comprises, comprised and comprising" and the terms "include, included, includes and including" are all deemed totally interchangeable and should be afforded the widest possible interpretation.

The invention is in no way limited to the embodiments hereinbefore described but may be varied in both detail and construction within the scope of the claims.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A system for monitoring the location of a mobile network unit, the system comprising a localised wireless communication network having a control unit, a plurality of fixed network units and at least one mobile network unit:
   the control unit further comprising a processor having an accessible memory;
   the mobile network unit further comprising a transmitter for transmitting an identification signal unique to that mobile network unit;
   the fixed network units each having a transceiver to receive the identification signal directly from a mobile network unit within a predetermined radius of the fixed network unit and indirectly from another fixed network unit, and to transmit the identification signal and a signal strength data to the control unit through the wireless communication network;
   the fixed network units each having a sensor to measure the strength of the identification signal received directly from the mobile network unit and output the measured strength as the signal strength data;
   the control unit processor having means to process the identification signal and the signal strength data received from a pair of the fixed network units that received the identification signal directly from the mobile network unit and determine the location of the mobile network unit.

2. The system as claimed in claim 1 in which the control unit processor has means to process the identification signal and the signal strength data received from three of the fixed network units, each of the three fixed network units having received the identification signal directly from the mobile network unit, and determine the location of the mobile network unit.

3. The system as claimed in claim 1 in which the wireless communication network further comprises a wireless personal area network (WPAN).

4. The system as claimed in claim 3 in which the WPAN is a ZigBee network.

5. The system as claimed in claim 1 in which the system is installed in a structure and in which the control unit has a floor plan layout of the structure stored in the memory, the control unit processor having a plotter to plot the location of a mobile network unit on the floor plan layout.

6. The system as claimed in claim 5 in which the control unit processor has means to plot the movement of a mobile network unit in the structure over time.

7. The system as claimed in claim 1 in which the mobile network unit further comprises a receiver to receive an identity code from a user and the identification signal transmitted by the mobile network unit is generated using the identity code supplied by the user.

8. The system as claimed in claim 7 in which the receiver to receive the identity code from a user further comprises a card reader having means to read information from a data storage element on an identity card supplied by the user.

9. The system as claimed in claim 7 in which the receiver to receive the identity code from a user further comprises a keypad having means to receive an identity code input on the keypad by the user.

10. The system as claimed in claim 1 in which the mobile network unit has means to cause the transmitter to transmit the identification signal periodically at predetermined intervals.

11. The system as claimed in claim 1 in which the mobile network unit has a sensor responsive to a users actions and the mobile network unit has means to cause the transmitter to transmit the identification signal in response to a mobile network unit operator's actions.

12. The system as claimed in claim 1 in which the predetermined radius of the fixed network unit is of the order of a 5 meter radius.

13. The system as claimed in claim 1 in which the identification signal and the signal strength data received by the control unit are time stamped.

14. The system as claimed in claim 1 in which the control unit processor has an analyser to analyse the movement patterns of one of an individual mobile network unit and a group of mobile network units.

15. The system as claimed in claim 14 in which the control unit has means to generate an alarm based on predetermined irregular movement patterns of the mobile network unit.

16. The system as claimed in claim 1 in which the control unit processor has an analyser to analyse the movement patterns of one of an individual mobile network unit and a group of mobile network units in a particular area.

17. A method of monitoring the location of a mobile network unit in a system comprising a localised wireless communication network having a control unit, a plurality of fixed network units and at least one mobile network unit, the mobile network unit having a transmitter to transmit an identification signal unique to that mobile network unit, the fixed network units each having a transceiver to receive the identification signal directly from a mobile network unit within a predetermined radius of the fixed network unit and indirectly from another fixed network unit, and transmit the identification signal and a signal strength data to the control unit through the wireless communication network, the fixed network units having a sensor to measure the strength of the identification signal received directly from the mobile network unit and output the measured strength as the signal strength data, the control unit having a processor and accessible memory, the method comprising the steps of:
    the mobile network unit transmitting an identification signal unique to that mobile network unit;
    any of the fixed network units that receive that identification signal directly from the mobile network unit measuring the strength of the identification signal and transmitting the received identification signal and the signal strength data to the control unit;
    any of the fixed network units that receive the identification signal and signal strength data indirectly from another fixed network unit transmitting the identification signal and signal strength data onwards to the control unit;
    the control unit processor processing the identification signal and the signal strength data received from a pair of the fixed network units that received the identification signal directly from the mobile network unit and determining the location of the mobile network unit.

18. The method as claimed in claim 17 in which the method further comprises the step of the control unit receiving the identification signal and the signal strength data from three fixed network units that received the identification signal directly and thereafter determining the location of the mobile network unit by triangulating the identification signal data.

19. The method as claimed in claim 17 in which the wireless communication network further comprises a wireless personal area network (WPAN) and in which the step of transmitting the identification signal to the control unit further comprises transmitting the identification signal through the WPAN.

20. The method as claimed in claim 19 in which the WPAN is a ZigBee network and the step of transmitting the identification signal to the control unit further comprises transmitting the identification signal through a ZigBee communications network.

21. The method as claimed in claim 17 in which the wireless communication network is installed in a structure and the control unit has a floor plan layout of the structure stored in memory, the method further comprising the steps of the control unit plotting the location of a mobile network unit on the floor plan layout.

22. The method as claimed in claim 21 in which the control unit plots the movement of the mobile network unit in the structure over time.

23. The method as claimed in claim 17 in which the method further comprises the steps of the mobile network unit receiving an identity code from a user and generating the identification signal using the identity code provided by the user.

24. The method as claimed in claim 17 in which the step of the mobile network unit transmitting an identification signal unique to that mobile network unit further comprises the mobile network unit transmitting the identification signal periodically at predetermined intervals.

25. The method as claimed in claim 17 in which the step of the mobile network unit transmitting an identification signal unique to that mobile network unit further comprises the mobile network unit transmitting the identification signal in response to a mobile network unit operator's actions.

26. The method as claimed in claim 17 in which the method comprises the step of the control unit analysing the movement patterns of one of an individual mobile network unit and a group of mobile network units.

27. The method as claimed in claim 26 in which the method comprises the additional step of the control unit generating an alarm based on predetermined irregular movement patterns of the mobile network unit.

28. The method as claimed in claim 17 in which the method comprises the step of the control unit analysing the movement patterns of a mobile network unit in a particular area.

29. A system for monitoring the location of a mobile network unit, the system comprising a localised wireless communication network having a control unit, a plurality of fixed network units and at least one mobile network unit:
    the control unit further comprising a processor having an accessible memory;
    the mobile network unit further comprising a transmitter for transmitting an identification signal unique to that mobile network unit, and means to receive an identity code from a user so that the identification signal transmitted by the mobile network unit is generated using the identity code received from the user;
    the fixed network units each having a transceiver to receive the identification signal directly from a mobile network unit within a predetermined radius of the fixed network unit and indirectly from another fixed network unit, and to transmit the identification signal and a signal strength data to the control unit through the wireless communication network;
    the fixed network units each having a sensor to measure the strength of the identification signal received directly from the mobile network unit and output the measured strength as the signal strength data;
    the control unit processor having means to process the identification signal and the signal strength data received from a pair of the fixed network units that received the identification signal directly from the mobile network unit and determine the location of the mobile network unit.

30. The system as claimed in claim 29 in which the means to receive the identity code from a user further comprises a card reader having means to read information from a data storage element on an identity card.

31. The system as claimed in claim 29 in which the means to receive the identity code from a user further comprises a keypad having means to receive an identity code input on the keypad.

32. A system for monitoring the location of a mobile network unit, the system comprising a localised wireless communication network having a control unit, a plurality of fixed network units and at least one mobile network unit:

the control unit further comprising a processor having an accessible memory;

the mobile network unit further comprising a transmitter for transmitting an identification signal unique to that mobile network unit, the mobile network unit transmitter transmitting the identification signal both periodically at predetermined intervals and in response to a mobile network unit operator's actions;

the fixed network units each having a transceiver to receive the identification signal directly from a mobile network unit within a predetermined radius of the fixed network unit and indirectly from another fixed network unit, and to transmit the identification signal and a signal strength data to the control unit through the wireless communication network;

the fixed network units each having a sensor to measure the strength of the identification signal received directly from the mobile network unit and output the measured strength as the signal strength data;

the control unit processor having means to process the identification signal and the signal strength data received from a pair of the fixed network units that received the identification signal directly from the mobile network unit and determine the location of the mobile network unit.

33. The system as claimed in claim 32 in which the control unit processor has an analyser to analyse the movement patterns of one of an individual mobile network unit and a group of mobile network units.

34. The system as claimed in claim 33 in which the control unit has means to generate an alarm based on predetermined irregular movement patterns of the mobile network unit.

35. The system as claimed in claim 32 in which the control unit has an analyser to analyse the movement patterns of one of an individual mobile network unit and a group of mobile network units in a particular area.

36. A method of monitoring the location of a mobile network unit in a system comprising a localised wireless communication network having a control unit, a plurality of fixed network units and at least one mobile network unit, the mobile network unit having a transmitter to transmit an identification signal unique to that mobile network unit, the fixed network units each having a transceiver to receive the identification signal directly from a mobile network unit within a predetermined radius of the fixed network unit and indirectly from another fixed network unit, and transmit the identification signal and a signal strength data to the control unit through the wireless communication network, the fixed network units having a sensor to measure the strength of the identification signal received directly from the mobile network unit and output the measured strength as the signal strength data, the control unit having a processor and accessible memory, the method comprising the steps of:

the mobile network unit receiving an identity code from a user;

the mobile network unit generating an identification signal unique to that mobile network unit using the identity code of the user and transmitting the identification signal;

any of the fixed network units that receive that identification signal directly from the mobile network unit measuring the strength of the identification signal and transmitting the received identification signal and the signal strength data to the control unit;

any of the fixed network units that receive the identification signal and signal strength data indirectly from another fixed network unit transmitting the identification signal and signal strength data onwards to the control unit;

the control unit processor processing the identification signal and the signal strength data received from a pair of the fixed network units that received the identification signal directly from the mobile network unit and determining the location of the mobile network unit.

37. A method of monitoring the location of a mobile network unit in a system comprising a localised wireless communication network having a control unit, a plurality of fixed network units and at least one mobile network unit, the mobile network unit having a transmitter to transmit an identification signal unique to that mobile network unit, the fixed network units each having a transceiver to receive the identification signal directly from a mobile network unit within a predetermined radius of the fixed network unit and indirectly from another fixed network unit, and transmit the identification signal and a signal strength data to the control unit through the wireless communication network, the fixed network units having a sensor to measure the strength of the identification signal received directly from the mobile network unit and output the measured strength as the signal strength data, the control unit having a processor and accessible memory, the method comprising the steps of:

the mobile network unit transmitting an identification signal unique to that mobile network unit both periodically at predetermined intervals and in response to a mobile network unit operator's actions;

any of the fixed network units that receive that identification signal directly from the mobile network unit measuring the strength of the identification signal and transmitting the received identification signal and the signal strength data to the control unit;

any of the fixed network units that receive the identification signal and signal strength data indirectly from another fixed network unit transmitting the identification signal and signal strength data onwards to the control unit;

the control unit processor processing the identification signal and the signal strength data received from a pair of the fixed network units that received the identification signal directly from the mobile network unit and determining the location of the mobile network unit.

38. The method as claimed in claim 37 in which the method comprises the step of the control unit analysing the movement patterns of one of an individual mobile network unit and a group of mobile network units.

39. The method as claimed in claim 38 in which the method comprises the additional step of the control unit generating an alarm based on predetermined irregular movement patterns of the mobile network unit.

40. The method as claimed in claim 37 in which the method comprises the step of the control unit analysing the movement patterns of one of an individual mobile network unit and a group of mobile network units in a particular area.

* * * * *